(12) United States Patent
Ronk et al.

(10) Patent No.: US 8,079,928 B2
(45) Date of Patent: Dec. 20, 2011

(54) TRANSFER CASE WITH OVERDRIVE MODE

(75) Inventors: Aaron Ronk, Liverpool, NY (US); Matt Phalen, Clay, NY (US); Christopher J. Decker, Cicero, NY (US); Nancy Mintonye, Kirkville, NY (US); John D. Zalewski, Liverpool, NY (US)

(73) Assignee: MAGNA Powertrain USA, Inc., Troy, MI (US)

( * ) Notice: Subject to any disclaimer, the term of this patent is extended or adjusted under 35 U.S.C. 154(b) by 969 days.

(21) Appl. No.: 12/036,351

(22) Filed: Feb. 25, 2008

(65) Prior Publication Data

US 2008/0234091 A1 Sep. 25, 2008

Related U.S. Application Data

(60) Provisional application No. 60/919,544, filed on Mar. 22, 2007.

(51) Int. Cl.
*F16H 37/06* (2006.01)
(52) U.S. Cl. ............... 475/213; 475/204; 475/303
(58) Field of Classification Search ............... 180/249; 475/302, 303, 210, 213
See application file for complete search history.

(56) References Cited

U.S. PATENT DOCUMENTS

| | | |
|---|---|---|
| 3,963,085 A | 6/1976 | Vinton |
| 4,628,770 A | 12/1986 | Kodama et al. |
| 4,798,103 A | 1/1989 | Eastman et al. |
| 5,334,116 A * | 8/1994 | Baxter, Jr. ............. 180/249 |
| 5,345,840 A | 9/1994 | Frost |
| 5,503,603 A | 4/1996 | Adam et al. |
| 5,609,540 A * | 3/1997 | Brissenden et al. ....... 475/206 |
| 5,651,748 A | 7/1997 | Adam et al. |
| 5,695,022 A | 12/1997 | Zalewski et al. |
| 5,954,612 A | 9/1999 | Baxter, Jr. |
| 6,447,418 B1 | 9/2002 | Fleytman |
| 6,464,612 B2 | 10/2002 | Frost |
| 6,612,959 B2 | 9/2003 | Frost |
| 7,101,301 B2 | 9/2006 | Haka |
| 7,172,528 B2 | 2/2007 | Yu et al. |
| 2005/0202920 A1 | 9/2005 | Kelley |

OTHER PUBLICATIONS

European Search Report for European Patent Application No. 08726812.4, dated May 10, 2010.

* cited by examiner

*Primary Examiner* — David D Le
*Assistant Examiner* — Derek D Knight
(74) *Attorney, Agent, or Firm* — Harness, Dickey & Pierce, P.L.C.

(57) ABSTRACT

A transfer case includes an input shaft and first and second output shafts. An overdrive unit is driven at an increased speed relative to the input shaft. A clutch is operable in a first position to establish a drive connection between the input shaft and the first output shaft. The clutch is further operable in a second position to establish a drive connection between the overdrive unit and the first output shaft. An actuator is driven by a motor for moving the clutch between its first and second positions. The actuator includes an axially movable fixed disk fixed for rotation with an output member of the overdrive unit. The shift engages an axially movable sleeve of the clutch.

21 Claims, 4 Drawing Sheets

TRANSFER CASE WITH OVERDRIVE MODE

CROSS-REFERENCE TO RELATED APPLICATIONS

This application claims the benefit of U.S. Provisional Application No. 60/919,544, filed on Mar. 22, 2007. The disclosure of the above application is incorporated herein by reference.

BACKGROUND

The statements in this section merely provide background information related to the present disclosure and may not constitute prior art.

The present disclosure relates generally to transfer cases for use in four-wheel drive motor vehicles and, more particularly, to a transfer case providing an overdrive ratio.

Due to growing consumer demand for four-wheel drive vehicles, many different power transfer systems are currently utilized for directing power (i.e., drive torque) to all four wheels of the vehicle. For example, in some "part-time" power transfer systems, a transfer case is installed between the front and rear drivelines and is normally operable in a two-wheel drive mode for delivering drive torque to the driven wheels. When the four-wheel drive mode is desired, a mode shift mechanism is selectively actuated by the vehicle operator for directly coupling the non-driven wheels to the driven wheels for establishing a part-time or locked four-wheel drive mode. The mode shift mechanism may also be automatically controlled to provide drive torque to all four wheels "on-demand".

A significant number of the transfer cases discussed above are equipped with a gear reduction unit and a range shift mechanism operable for permitting the vehicle operator to choose between a high-range and a low-range drive mode. The high-range typically directly interconnects the input shaft to the output shaft to establish a direct drive mode. The low-range drive mode is an underdrive ratio useful during low-speed off-road conditions.

In most four-wheel drive vehicles equipped with a transfer case, the transmission output shaft is coupled to the transfer case input shaft. However, in some applications, an add-on gearbox, commonly referred to as a compounder assembly, is installed between the transmission output shaft and the transfer case input shaft for providing an additional gear ratio, such as an "overdrive" ratio. An example of an add-on overdrive transmission assembly is shown in commonly-owned U.S. Pat. No. 4,798,103. Due to the long leadtime and cost associated with developing new multi-speed transmissions, the use of a compounder assembly in conjunction with an existing transmission for providing an additional gear ratio has found commercial success. One design compromise, however, is the additional length required in the vehicle's powertrain to accept installation of the compounder assembly.

From the foregoing, it is apparent that transfer cases equipped with two-speed gear reduction units have been successfully integrated into four-wheel drive vehicles. However, a need still exists to develop alternative gear driven units that further advance the technology in the field of four-wheel drive transfer cases.

SUMMARY

A transfer case according to the teachings of the present disclosure includes an input shaft and first and second output shafts. An overdrive unit is driven at an increased speed relative to the input shaft. A clutch is operable in a first position to establish a drive connection between the input shaft and the first output shaft. The clutch is further operable in a second position to establish a drive connection between the overdrive unit and the first output shaft. An actuator is driven by a motor for moving the clutch between its first and second positions. The actuator includes an axially movable shift disk fixed for rotation with an output member of the overdrive unit. The shift disk engages an axially movable sleeve of the clutch.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
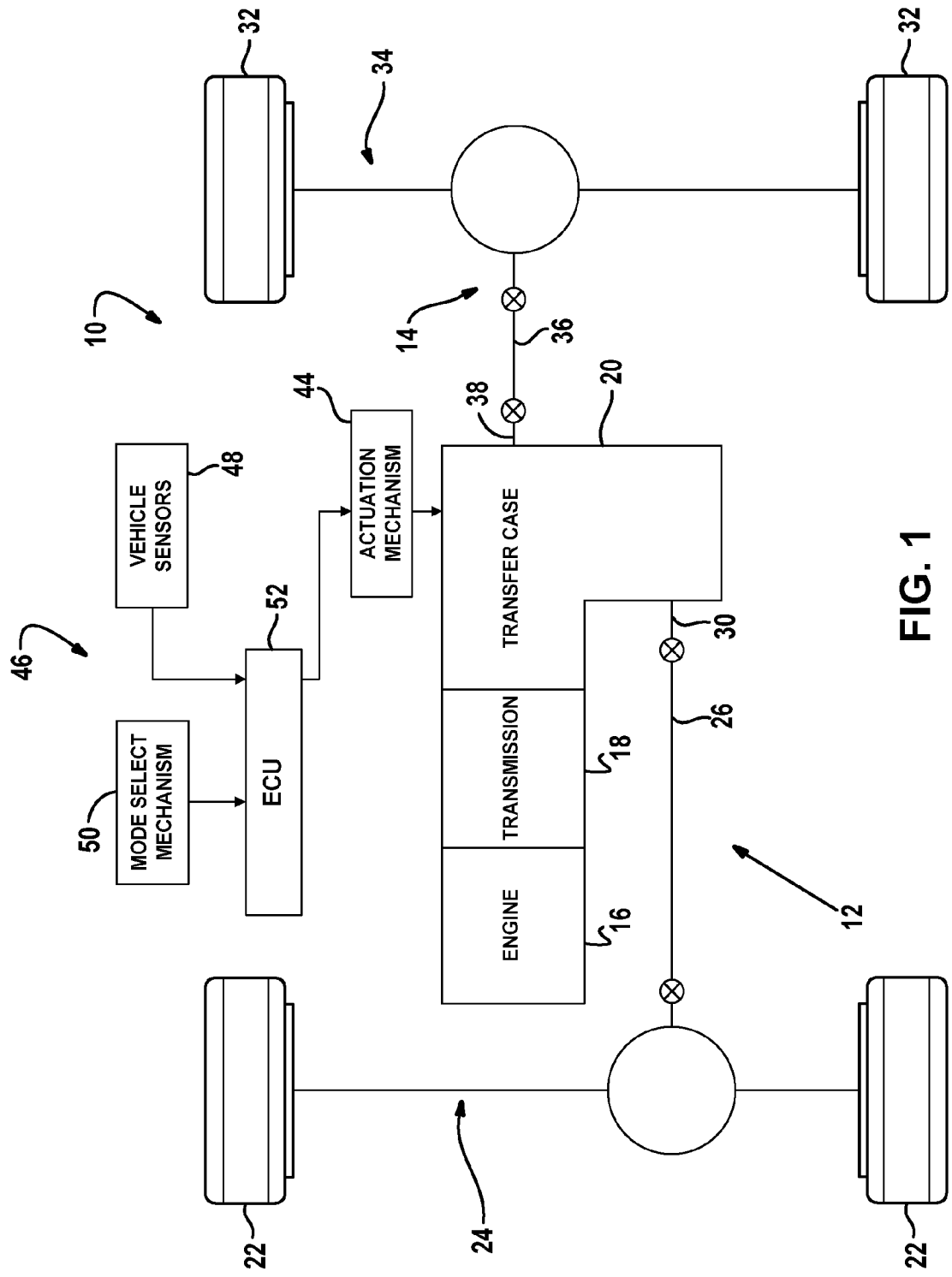
FIG. 1 is a schematic depicting an exemplary vehicle equipped with a transfer case according to the teachings of the present disclosure.

Referring to FIG. 1 of the drawings, a four-wheel drive vehicle 10 is schematically shown to include a front driveline 12, a rear driveline 14 and a powertrain for generating and selectively delivering rotary tractive power (i.e., drive torque) to the drivelines. The powertrain is shown to include an engine 16 and a transmission 18 which may be of either the manual or automatic type. In the particular embodiment shown, vehicle 10 further includes a transfer case 20 for transmitting drive torque from the powertrain to front driveline 12 and rear driveline 14. Front driveline 12 includes a pair of front wheels 22 connected via a front axle assembly 24 and a front propshaft 26 to a front output shaft 30 of transfer case 20. Similarly, rear driveline 14 includes a pair of rear wheels 32 connected via a rear axle assembly 34 and a rear propshaft 36 to a rear output shaft 38 of transfer case 20.

As will be further detailed, transfer case 20 is equipped with a two-speed overdrive unit 40, a mode clutch assembly 42 and a power-operated actuation mechanism 44 that is operable to control coordinated shifting of overdrive unit 40 and adaptive engagement of mode clutch assembly 42. In addition, a control system 46 is provided for controlling actuation of actuation mechanism 44. Control system 46 includes vehicle sensors 48 for detecting real-time operational characteristics of motor vehicle 10, a mode select mechanism 50 for permitting the vehicle operator to select one of the available drive modes and an electronic control unit (ECU) 52 that is operable to generate electric control signals in response to input signals from sensors 48 and mode signals from mode select mechanism 50.

Figure 2:
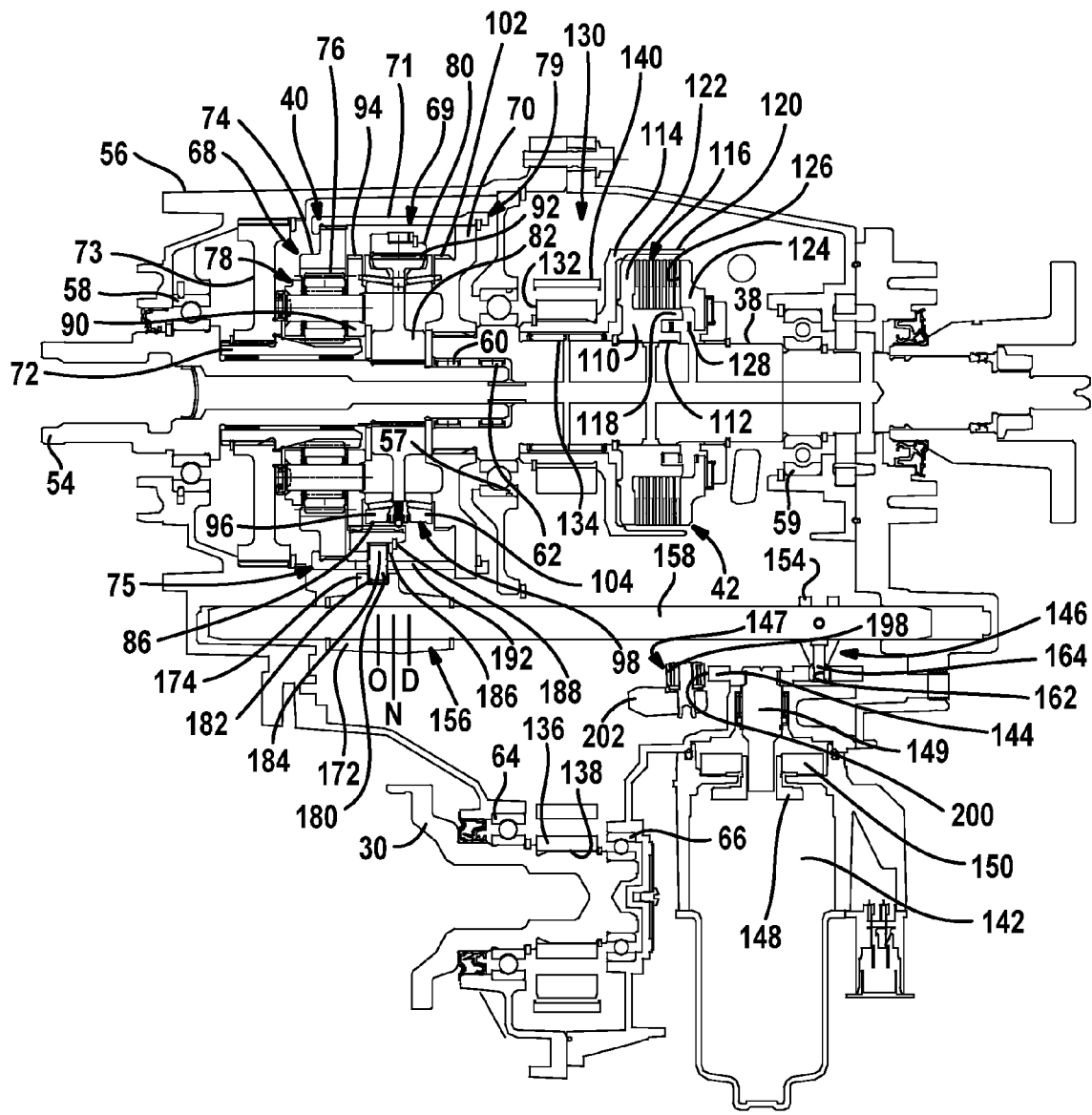
FIG. 2 is a cross-sectional side view of the transfer case with overdrive mode.
Figure 3:
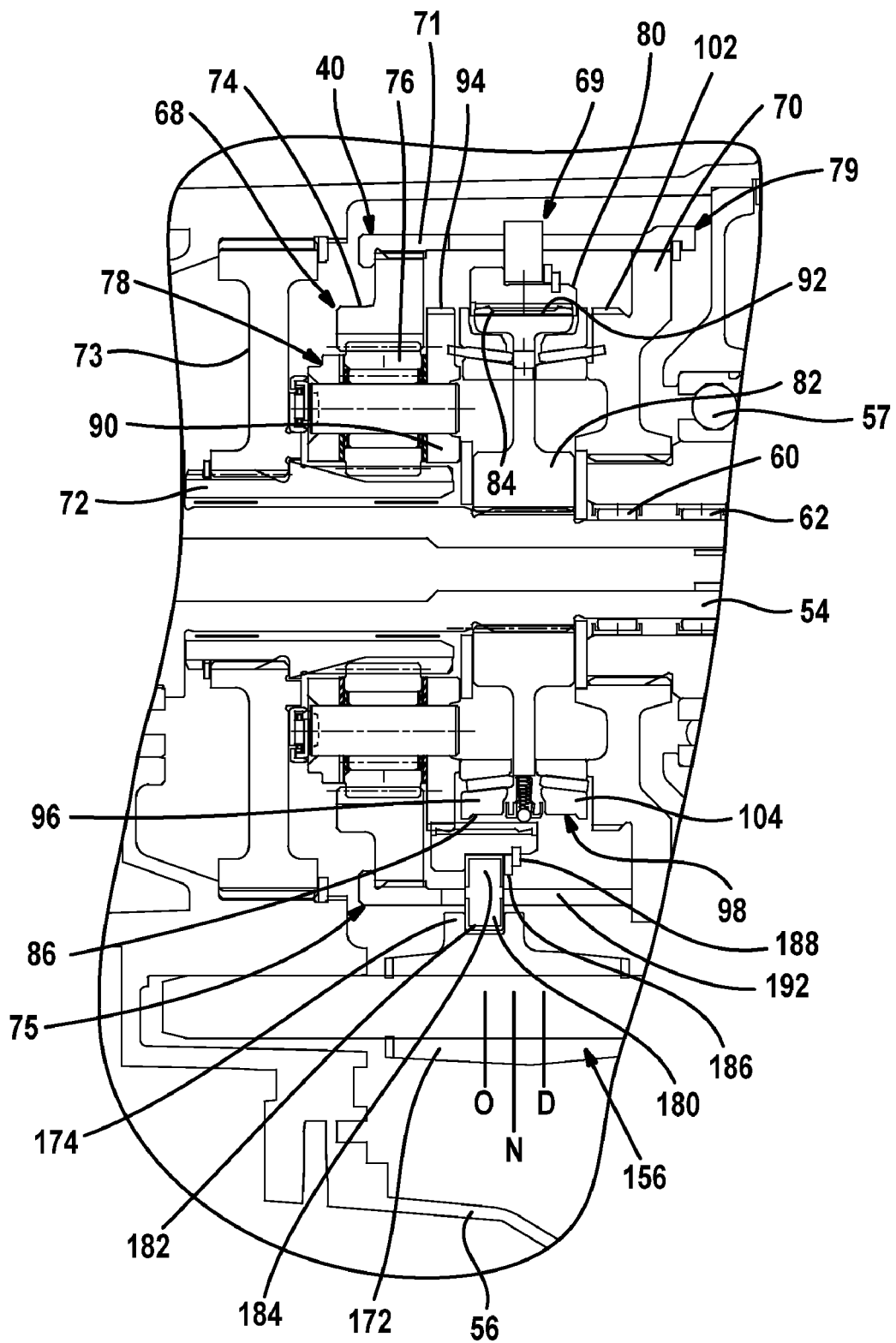
FIG. 3 is an enlarge cross-sectional side view showing a portion of the transfer case depicted in FIG. 2.

FIGS. 2 and 3 depict transfer case 20 including an input shaft 54 that is adapted for driven connection to the output shaft of transmission 18. Input shaft 54 is supported in a housing 56 by a bearing assembly 58 for rotation about a first rotary axis. Rear output shaft 38 is supported in housing 56 for rotation about the first rotary axis by a center bearing assembly 57 and a rear bearing 59. A pair of laterally-spaced bearing assemblies 60 and 62 support input shaft 54 within a cavity formed in rear output shaft 38. In addition, front output shaft 30 is supported in housing 56 for rotation about a second rotary axis via a pair of bearing assemblies 64 and 66. It should be appreciated that center bearing assembly 57 and its support are optional features and other constructions are within the scope of the present disclosure.

Overdrive unit 40 is shown to generally include a planetary gearset 68, a clutch 69, a drive plate 70 and a connector drum 71. Planetary gearset 68 has a sun gear 72 non-rotatably fixed to housing 56 via a grounding plate 73, a ring gear 74 fixed for rotation with a first end 75 of connector drum 71 and a plurality of planet gears 76 rotatably supported from a planet carrier 78. As seen, planet gears 76 are meshed with both sun gear 72 and ring gear 74. Drive plate 70 is splined for rotation with rear output shaft 38 and is also rigidly coupled to a second end 79 of connector drum 71 via another spline connection. Planetary gearset 68 functions to drive ring gear 74 at an increased speed relative to input shaft 54. Connector drum 71 spans across clutch 69 to fix ring gear 74 for rotation with drive plate 70.

Clutch 69 includes a synchronizer or clutch sleeve 80 coupled via a spline connection for rotation with a drive hub 82. Clutch sleeve 80 includes longitudinally-extending internal spline teeth 84 which are meshed with longitudinally-extending external teeth 92 formed on drive hub 82 for axial sliding movement relative thereto. Drive hub 82 is fixed for rotation with input shaft 54. Clutch 69 includes a first synchronizer assembly 86 operably located between drive hub 82 and a rear carrier plate 90 of planet carrier 78. As noted, drive hub 82 has longitudinally-extending external teeth 92 formed thereon which are aligned with external clutch teeth 94 formed on rear carrier plate 90. First synchronizer assembly 86 is operable for causing speed synchronization between input shaft 54 and planet carrier 78 in response to movement of clutch sleeve 80 from a neutral position (denoted by position line "N") toward an overdrive position (denoted by position line "O"). Once the speed synchronization process is completed, clutch sleeve 80 is permitted to move through the teeth of a blocker ring 96 and into coupled engagement with rear carrier plate 90 such that its teeth 84 meshingly engage clutch teeth 94 on rear carrier plate 90. Accordingly, with clutch sleeve 80 located in its O position, drive hub 82 is drivingly coupled to rear carrier plate 90 such that planet carrier 78 is coupled to rotate at the same speed as input shaft 54. As such, ring gear 74 rotates at an overdrive speed ratio relative to input shaft 54 thereby establishing the overdrive connection between input shaft 54 and rear output shaft 38.

Clutch 69 further includes a second synchronizer assembly 98 operably disposed between drive hub 82 and drive plate 70. Second synchronizer assembly 98 is operable for causing speed synchronization between input shaft 54 and rear output shaft 38 in response to movement of clutch sleeve 80 from its N position toward a direct drive position (denoted by position line "D"). Once speed synchronization is complete, clutch sleeve 80 is permitted to move through the teeth of a second blocker ring 104 and into coupled engagement with drive plate 70 such that its internal spline teeth 84 meshingly engage external clutch teeth 102 formed on drive plate 70 for establishing the direct drive connection therebetween. With clutch sleeve 80 located in its D position, drive hub 82 drives drive plate 70 at the same speed as input shaft 54, thereby establishing the direct drive connection between input shaft 54 and rear output shaft 38. First synchronizer assembly 86 and second synchronizer assembly 98 can be any conventional construction such as, for example, single-cone or dual-cone arrangements. Thus, it will be appreciated by those skilled in the art that any type of suitable synchronizer arrangement can be used for facilitating speed synchronization between the components that are to be directly coupled.

The upper half of FIG. 3 shows clutch sleeve 80 in its neutral position (denoted by position line "N") where its spline teeth 84 are released from engagement with clutch teeth 94 on rear carrier plate 90 and clutch teeth 102 on drive plate 70, yet maintain engagement with spline teeth 92 on drive hub 82. As such, driven rotation of input shaft 54 causes rotation of clutch sleeve 80 and drive hub 82. Since clutch sleeve 80 does not couple input shaft 54 to either of rear carrier plate 90 and drive plate 70 when it is in its N position, no drive torque is transferred through drive hub 82 to front or rear output shafts 30 and 38, respectively, thereby establishing the neutral non-driven mode. Thus, internal teeth 84 on clutch sleeve 80 maintain engagement with external spline teeth 92 on drive hub 82 throughout the entire length of axial travel of clutch sleeve 80 between its O and D positions.

It will be appreciated that planetary gearset 68 and clutch 69 function to provide transfer case 20 with a two-speed (i.e., overdrive and direct drive) feature. However, the synchronized shift unit disclosed could be easily replaced with a non-synchronized range shift system including a dog clutch. Furthermore, any other two-speed gear drive unit having a shift member axially moveable to establish first and second drive connections between input shaft 54 and rear output shaft 38 is considered to be within the scope of this disclosure. It should also be appreciated that provision of the direct drive ratio and the overdrive ratio within the transfer case effectively doubles the number of gears provided by transmission 18. Fuel efficiency and increased vehicle gas mileage may likely be a result of use of transfer case 20 of the present disclosure.

Referring primarily to FIG. 2, mode clutch assembly 42 is shown to include a clutch hub 110 fixed via a spline connection 112 for common rotation with rear output shaft 38, a clutch drum 114 and a multi-plate clutch pack 116 operably disposed between clutch hub 110 and drum 114. As seen, clutch pack 116 includes a set of inner clutch plates splined to a cylindrical rim segment 118 of clutch hub 110 and which are alternately interleaved with a set of outer clutch plates splined to a cylindrical rim segment of drum 114. Clutch pack 116 is retained for limited sliding movement between a reaction plate segment 122 of clutch hub 110 and a pressure plate 124. Pressure plate 124 has a face surface 126 adapted to engage and apply a compressive clutch engagement force on clutch pack 116. Pressure plate 124 is splined to rim segment 118 for common rotation with clutch hub 110. A return spring 128 is provided between clutch hub 110 and pressure plate 124 for normally biasing pressure plate 124 away from engagement with clutch pack 116.

Upon engagement of mode clutch assembly 42, drive torque is transmitted from rear output shaft 38 through clutch pack 116 and a transfer assembly 130 to front output shaft 30. Transfer assembly 130 includes a first sprocket 132 rotatably supported by bearing assemblies 134 on rear output shaft 38, a second sprocket 136 fixed via a spline connection 138 for common rotation with front output shaft 30, and a power chain 140 encircling sprockets 132 and 136. Clutch drum 114 is fixed for rotation with first sprocket 132 such that drive torque transferred through clutch pack 116 is transmitted through transfer assembly 130 to front output shaft 30.

Pressure plate 124 is axially moveable relative to clutch pack 116 between a first or "released" position and a second or "locked" position. With pressure plate 124 in its released position, a minimum clutch engagement force is exerted on clutch pack 116 such that virtually no drive torque is transferred through mode clutch assembly 42 so as to establish a two-wheel drive mode. Return spring 128 is arranged to normally urge pressure plate 124 toward its released position. In contrast, location of pressure plate 124 in its locked position causes a maximum clutch engagement force to be applied to clutch pack 116 such that front output shaft 30 is, in effect, coupled for common rotation with rear output shaft 38 so as to establish a locked or "part-time" four-wheel drive mode. Therefore, accurate control of the position of pressure plate 124 between its released and locked positions permits adaptive regulation of the torque transfer between rear output shaft 38 and front output shaft 30, thereby permitting establishment of an adaptive or "on-demand" four-wheel drive mode.

Power-operated actuation mechanism 44 is operable to coordinate movement of clutch sleeve 80 between its three distinct range positions (O,N,D) with movement of pressure plate 124 between its released and locked positions. In its most basic form, actuation mechanism 44 includes an electric motor 142, a cam plate 144 driven by electric motor 142, a range actuator assembly 146, and a mode actuator assembly 147. The output of a reduction geartrain 148 provides a drive connection between an output spindle of electric motor 142 and a driven actuator shaft 149. Reduction geartrain 148 may include a planetary gearset positioned within a common housing of electric motor 142. Cam plate 144 is fixed for rotation with the distal end of actuator shaft 149. Actuation of electric motor 142 causes cam plate 144 to rotate about an axis extending perpendicular to an axis of rotation of rear output shaft 38. The reduction ratio provided by geartrain 148 permits the use of a smaller, low power electric motor. An angular position sensor or encoder 150 may be mounted to actuator shaft 149 or cam plate 144 for providing ECU 52 with an input signal indicative of the angular position of cam plate 144.

Range actuator assembly 146 is operable to convert bidirectional rotary motion of cam plate 144 into bidirectional translational movement of clutch sleeve 80 between its three distinct range positions. Referring primarily to FIG. 2, range actuator assembly 146 is shown to generally include a range shuttle 154, a range fork 156 and a shift rail 158. Opposite ends of shift rail 158 are slidingly retained in sockets formed in housing 56. An elongated range slot 162 is formed in cam plate 144 and receives a follower pin 164 that is fixed to range shuttle 154. Range shuttle 154 is either directly fixed for axial translation with shift rail 158 or, in the alternative, is fixed via a spring biased mechanism for such translation with shift rail 158. Range slot 162 includes segments shaped to cause axial translation of follower pin 164 in response to rotation of cam plate 144. As will be appreciated, such axial movement of follower pin 164 causes corresponding axial movement of shift rail 158. Other segments of range slot 162 are configured to allow rotation of cam plate 144 without causing axial translation of follower pin 164 and shift rail 158. Range fork 156 is shown to include a sleeve segment 172 fixed to shift rail 158 and a cradle segment 174 which extends from sleeve segment 172.

Figure 4:
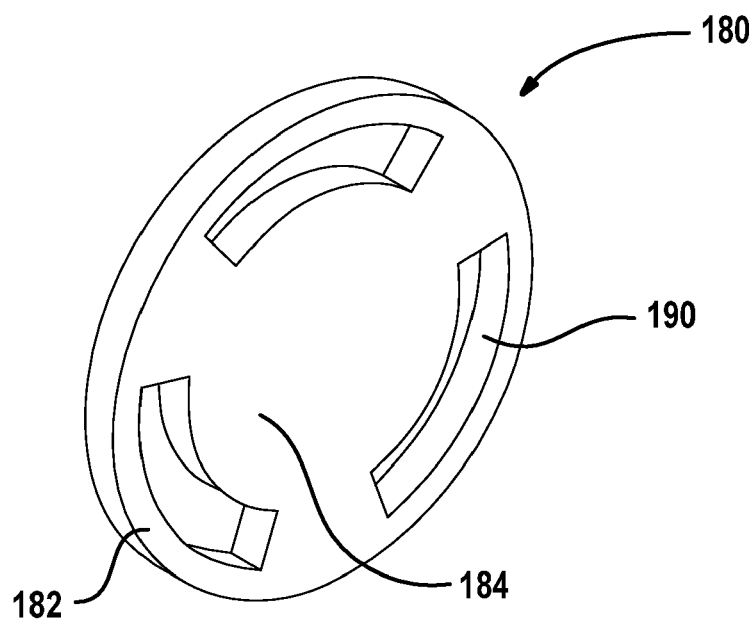
FIG. 4 is a perspective view of a shift disk of the transfer case.
Figure 5:
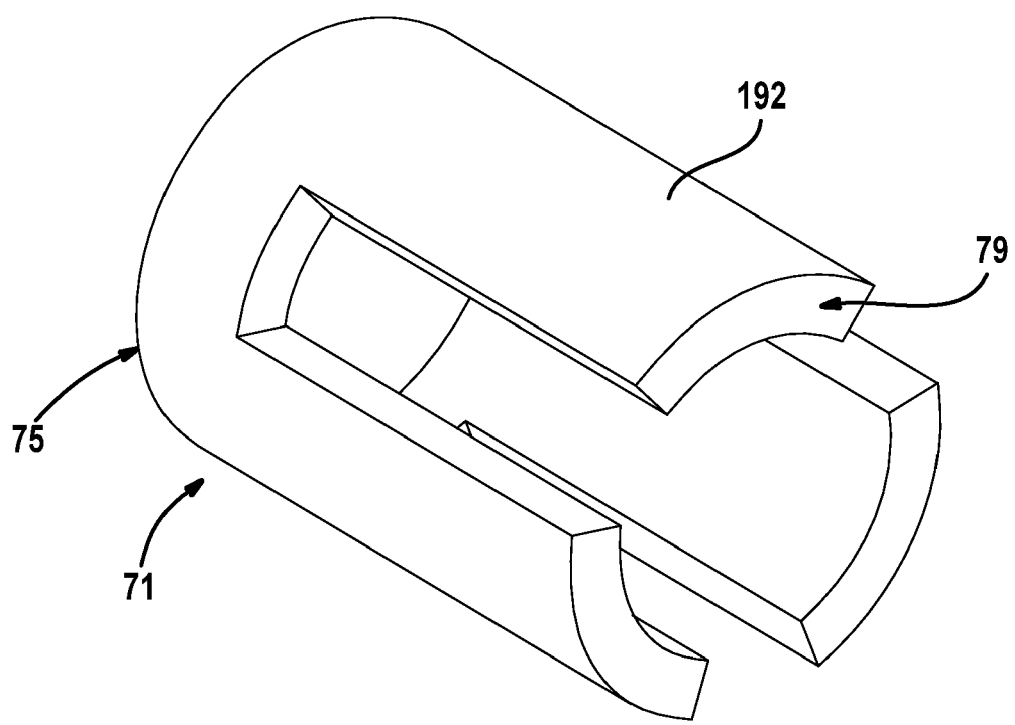
FIG. 5 is a perspective view of a conductor drum of the transfer case shown in FIG. 2.

Range actuator assembly 146 further includes a shift disk 180 having an outer circumferential portion 182 that is positioned within cradle segment 174 and an inner circumferential portion 184 that engages clutch sleeve 80. A thrust washer 186 and a retaining ring 188 restrict shift disk 180 from axially translating relative to clutch sleeve 80. As assembled, clutch sleeve 80 is capable of rotating relative to shift disk 180. FIG. 4 depicts shift disk 180 to include a plurality of arcuately shaped and spaced apart slots 190. FIG. 5 shows connector drum 71 having a plurality of circumferentially spaced apart and axially extending fingers 192 integrally formed with connector drum 71. Upon assembly, fingers 192 of connector drum 71 extend through slots 190 in shift disk 180. As such, shift disk 180 is axially movable relative to connector drum 71 while being fixed for common rotation therewith.

As noted, range actuator assembly 146 is arranged such that axial movement of range shuttle 154 results from movement of follower pin 164 within range slot 162 in response to rotation of cam plate 144. Such movement of range shuttle 154 causes axial translation of shift rail 158 and range fork 156 which, in turn, causes axial movement of shift disk 180. As noted, axial movement of shift disk 180 cause corresponding movement of clutch sleeve 80 between its three distinct range positions O, N and D. Specifically, when it is desired to shift overdrive unit 40 into its overdrive mode, electric motor 142 rotates actuator shaft 149 in a first direction which, in turn, causes concurrent rotation of cam plate 144. Rotation of cam plate 144 in this first direction causes follower pin 164 to move within range slot 162 and axially move range shuttle 154, shift rail 158, and range fork 156 in a first direction until clutch sleeve 80 is located in its O range position. With clutch sleeve 80 located in its O range position, the overdrive connection is established between input shaft 54 and rear output shaft 38. Continued rotation of cam plate 144 in the first direction causes follower pin 164 to enter a dwell segment of range slot 162 for preventing further axial movement of range shuttle 154, thereby maintaining clutch sleeve 80 in its O range position. The length of the dwell segment of range slot 162 is selected to permit sufficient additional rotation of cam plate 144 in the first rotary direction to accommodate actuation of mode clutch assembly 42 by mode actuator assembly 147.

With clutch sleeve 80 located in its O range position, subsequent rotation of cam plate 144 in the opposite or second direction causes follower pin 164 to begin axially moving clutch sleeve 80 in a second direction from its O range position toward its N range position. Upon continued rotation of cam plate 144 in the second direction, follower pin 164 enters a neutral segment of range slot 162. Follower pin 164 subsequently enters a contoured segment of range slot 162 that functions to move clutch sleeve 80 from its N range position in its D range position, whereby the direct drive connection between input shaft 54 and rear output shaft 38 is established. Continued cam plate 144 rotation causes follower pin 164 to enter another dwell segment to maintain clutch sleeve 80 in the D range position. The length of the dwell segment is selected to permit additional rotation of cam plate 144 in the second rotary direction to also accommodate actuation of mode clutch assembly 42.

Mode actuator assembly 147 is operable to convert bidirectional rotary motion of cam plate 144 into bidirectional translational movement of pressure plate 124 between its released and locked positions so as to permit adaptive regulation of the drive torque transferred through mode clutch assembly 42 to front output shaft 30. The entire actuation mechanism is not shown in detail. However, a roller 198 is shown in rolling engagement with a mode cam portion 200 of cam plate 144. Rotation of cam plate 144 selectively causes movement of an arm 202 to which roller 198 is fixed. Movement of arm 202 causes pressure plate 124 to be translated for applying a clutch engagement force to clutch pack 116 such that drive torque is transferred through mode clutch assembly 42. Various mode actuation assemblies are contemplated and examples are shown within U.S. Pat. Nos. 5,363,938, 6,645, 109, 6,905,436, 6,929,577 and 7,033,300 which are herein incorporated by reference. Accordingly, a more detailed explanation of the mode actuator assembly will not be provided.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without department from the spirit and scope of the disclosure as defined in the following claims.

What is claimed is:

1. A transfer case comprising:
an input shaft;
first and second output shafts;
an overdrive unit having an output member capable of being driven at an increased speed relative to said input shaft;
a clutch operable in a first position to establish a drive connection between said input shaft and said first output shaft and further operable in a second position to establish a drive connection between said overdrive unit and said first output shaft;
a motor; and
an actuator driven by said motor for moving said clutch between its first and second positions, said actuator including an axially moveable shift disk fixed for rotation with said output member of said overdrive unit, said shift disk engaging an axially moveable sleeve of said clutch.

2. The transfer case of claim 1 further including a connector drum fixed for rotation with said output member of said overdrive unit and said first output shaft.

3. The transfer case of claim 2 wherein said shift disk includes a plurality of spaced apart slots in receipt of a plurality of spaced apart fingers formed on said connector drum.

4. The transfer case of claim 3 wherein said connector drum is cylindrically shaped and said fingers are integrally formed with said connector drum.

5. The transfer case of claim 4 wherein said slots are arcuately shaped in receipt of arcuately shaped fingers.

6. The transfer case of claim 2 further including a drive member drivingly interconnecting said first output shaft and said connector drum.

7. The transfer case of claim 6 wherein said overdrive unit includes a non-rotatable sun gear, a ring gear fixed for rotation with said connector drum, and a carrier rotatably supporting planet gears meshed with said sun gear and said ring gear, and wherein movement of said clutch to its second position causes said sleeve to couple said carrier for rotation with said input shaft.

8. The transfer case of claim 6 wherein said clutch includes a drive hub fixed for rotation with said input shaft, said drive hub being positioned axially intermediate said overdrive unit and said drive member.

9. The transfer case of claim 8 wherein said clutch includes a synchronizer selectively restricting axial motion of said sleeve.

10. The transfer case of claim 2 wherein said connector drum spans said clutch.

11. The transfer case of claim 1 further including a mode clutch operable in a first mode to disengage said second output shaft from driven engagement with said first output shaft and further operable in a second mode to establish a drive connection between said first output shaft and said second output shaft.

12. The transfer case of claim 1 wherein said overdrive unit includes a planetary gearset having a sun gear restricted from rotation, a planet carrier being selectively driven by said input shaft when said clutch sleeve is in said second position, a ring gear being said output member, and planet gears rotatably supported by said planet carrier and meshed with said sun gear and said ring gear.

13. A transfer case comprising:
an input shaft;
an output shaft;
a clutch driven by said input shaft and moveable between first and second positions;
a planetary gearset including a non-rotary sun gear, a ring gear, a carrier, and planet gears rotatably supported by said carrier and meshed with said sun and ring gears;
a connector drum coupling said ring gear for rotation with said output shaft and defining axially extending fingers;
a shift disk having apertures through which said fingers extend such that said shift disk is coupled for rotation with said connector drum and axial movement thereon, said shift disk engaging said clutch; and
an actuator operable for moving said shift disk in a first direction for locating said clutch in its first position whereat said clutch establishes a direct drive connection between said input shaft and said output shaft, said actuator further operable for moving said shift disk in a second direction for locating said clutch in its second position whereat said clutch interconnects said carrier to said input shaft of establishing an overdrive connection between said input shaft and said output shaft.

14. The transfer case of claim 13 further comprising a drive plate coupling said connector drum to said output shaft, and wherein said clutch includes a clutch sleeve operable in its first position to couple said drive member for rotation with said input shaft and operable in its second position to couple said carrier for rotation with said input shaft.

15. The transfer case of claim 14 further including a first synchronizer operably disposed between said clutch sleeve and clutch teeth formed on said drive plate, and a second synchronizer operably disposed between said clutch sleeve and clutch teeth formed on said carrier.

16. The transfer case of claim 14 wherein an inner surface of said shift disk engages said clutch sleeve and said actuator engages an outer surface of said shift disk.

17. The transfer case of claim 14 wherein said connector drum surrounds said clutch sleeve with said clutch located between said gearset and said drive plate.

18. The transfer case of claim 17 wherein said clutch sleeve includes internal teeth rotatably meshed with external teeth of a drive hub fixed for rotation with said input shaft, and wherein movement of said clutch sleeve to its first position causes its internal teeth to engage clutch teeth formed on said drive plate and movement of said clutch sleeve to its second position causes its internal clutch teeth to engage clutch teeth formed on said carrier.

19. The transfer case of claim 14 wherein said actuator includes a shift member engaging said shift disk and an electric motor for causing axial movement of said shift member for controlling corresponding axial movement of said shift disk and said clutch sleeve.

20. The transfer case of claim 13 further including a mode clutch operable in a first mode to disengage a second output shaft from driven engagement with said first output shaft and further operable in a second mode to establish a drive connection between said first output shaft and said second output shaft.

21. The transfer case of claim 20 wherein said actuator controls coordinated operation of said clutch and said mode clutch.

* * * * *